United States Patent [19]

Simmons et al.

[11] Patent Number: 4,520,478
[45] Date of Patent: May 28, 1985

[54] SPACE STAGE ARRANGEMENT FOR A T-S-T DIGITAL SWITCHING SYSTEM

[75] Inventors: Nathaniel Simmons, Downers Grove, Ill.; Sergio E. Puccini, Scottsdale, Ariz.; Stig E. Magnusson; Kamal I. Parikh, both of Phoenix, Ariz.

[73] Assignee: GTE Automatic Electric Inc., Northlake, Ill.

[21] Appl. No.: 506,563

[22] Filed: Jun. 22, 1983

[51] Int. Cl.³ .............................................. H04J 11/04
[52] U.S. Cl. ..................................................... 370/63
[58] Field of Search .............................. 370/63, 64, 59

[56] References Cited

U.S. PATENT DOCUMENTS

| | | | |
|---|---|---|---|
| 3,049,593 | 8/1962 | Touraton et al. | 370/63 |
| 3,909,786 | 9/1975 | Lawrence | 370/63 |
| 3,974,340 | 8/1976 | Ghisler | 370/63 |
| 3,983,330 | 9/1976 | Tongi | 370/63 |
| 4,048,445 | 9/1977 | Ghisler | 370/63 |
| 4,071,702 | 1/1978 | Charransol et al. | 370/63 |

Primary Examiner—Douglas W. Olms
Assistant Examiner—Frank M. Scutch, III
Attorney, Agent, or Firm—Anthony Miologos; Peter Xiarhos

[57] ABSTRACT

A space stage for a T-S-T digital switching system is shown arranged to interconnect the originating time stages (OTS) and terminating time stages (TTS) of a first time group and the OTS's and TTS's of a second time group. The space stage includes four identical space stage units (SSU). The first SSU interconnects the OTS's and TTS's of the first time group and the second SSU the OTS's and TTS's of the second time group. The third SSU interconnects the OTS's of the first time group to the TTS's of the second time group and the fourth SSU interconnects the OTS's of the second time group to the TTS's of the first time group.

6 Claims, 4 Drawing Figures

SPACE STAGE ARRANGEMENT FOR A T-S-T DIGITAL SWITCHING SYSTEM

BACKGROUND OF THE INVENTION

This invention relates in general to time-space-time (T-S-T) telecommunication switching systems, and in particular to the functional configuration of the space stage in a T-S-T switching system.

Time-space-time (T-S-T) switching systems are a configuration of digital switching elements providing both time and space translation between channels of time division multiplexed (TDM) telecommunications transmission lines. The T-S-T network of a switching system interconnects digital bi-directional TDM communication lines with TDM communication involving the sharing of single transmission paths, individually, in time, to provide multiple channels in a single transmission medium. The construction of such a T-S-T network comprises the connection of a spacial stage between the two time stages.

Increasing the network capacity of a T-S-T digital switching system entails increasing the size of the time and space switching stages. The consequence of this network growth is that doubling the number of time stages increases the size of the space stage by a factor of two squared or 4 times.

Provisions for such network growth must be anticipated when such a T-S-T network is configured. Thus, a central exchange anticipating a certain amount of growth must ultimately install a space stage four times greater than its present requirements.

It would therefore be advantageous to provide a space stage arrangement for the T-S-T network of a digital switching system which can effectively interconnect the time stages of the network as the network grows.

SUMMARY OF THE INVENTION

The space stage arrangement of the present invention allows for the interconnection of a plurality of originating time stages (OTS) to terminating time stages (TTS) of a digital switching system. The time stages are divided into a first time group consisting of a selected and equal number of originating time stages and terminating time stages and a second time group consisting of a selected and equal number of originating time stages and terminating time stages.

The space stage is comprised of four identical switching matrices or space stage units (SSU) which provide time shared switching paths between the originating time stages and terminating time stages of both groups.

The first SSU includes a plurality of inputs each connected to an individual OTS of the first group and a plurality of outputs each connected to an individual TTS of the first time group. The first SSU provides selectable interconnections between the OTSs and TTSs of the first time group.

The second SSU includes a plurality of inputs each connected to an individual OTS of the second group and a plurality of outputs each connected to an individual TTS of the second time group. The second SSU provides selectable interconnections between the OTSs and TTSs of the second time group.

The first and second SSUs may also be described as INTRA SSUs since they interconnect the originating time stages to the terminating time stages of their respective groups. To interconnect all originating time stages to terminating time stages between the first and second groups in the digital switching system two additional SSUs or INTER group SSUs are used. The INTER group SSUs are identified as the third and fourth SSUs.

The third SSU includes a plurality of inputs each line connected to an individual OTS of the first time group and a plurality of outputs each connected to an individual TTS of the second time group. The third SSU provides selectable INTER group connections between the OTSs of the first time group to the TTSs of the second time group.

The fourth SSU includes a plurality of inputs each connected to an individual OTS of the second time group and a plurality of outputs each connected to an individual TTS of the first time group. The third SSU provides selectable INTER group interconnections between the OTSs of the second time group to the TTSs of the first time group.

A space stage controller connected to a central control complex provides each SSU with control signals. The control signals select the appropriate INTRA group or INTER group switched path through the space stage.

DESCRIPTION OF THE PREFERRED EMBODIMENT

Figure 1:
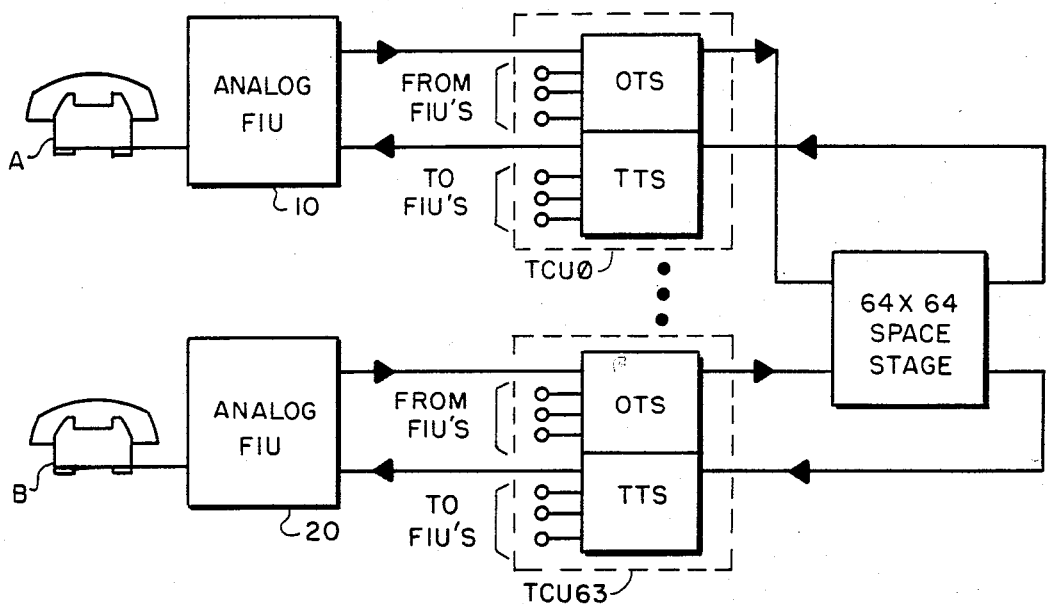
FIG. 1 is a block diagram depicting the network structure of a digital switching system.

FIG. 1, is a block diagram showing the single rail structure of a time-space-time network of a digital switching system for switching a local telephone call. Telephone subscriber A is connected to analog facility interface unit (FIU) 10. The analog FIU has a PCM voice connection to time and control unit (TCU) 0. The digital switching network may contain n number of TCUs, but will be limited to sixty-four TCUs for this embodiment. Each TCU has two time stages associated with it, an originating time stage (OTS) and a terminating time stage (TTS).

Each time stage (OTS or TTS) of each TCU may be connected to up to four FIUs. Therefore, the number of time control units (TCUs) is modularly expandable and may grow to fit the needs of the switching system. Next, a connection is made from the OTS of the particular TCU, in this example TCU 0 to the space stage 30 and the terminating time stage of TCU 63. The telephone subscriber B is then connected through analog FIU 20 to the TTS of TCU 63.

A voice transmission link is next established from subscriber B to subscriber A. This communication link is established via analog FIU 20, to the originating time stage (OTS) of TCU 63, through space stage 30, through the terminating time stage (TTS) of TCU 0, and finally through analog FIU 10 to subscriber A. At this time, a two way talking path has been established between subscribers A and B.

Figure 2:
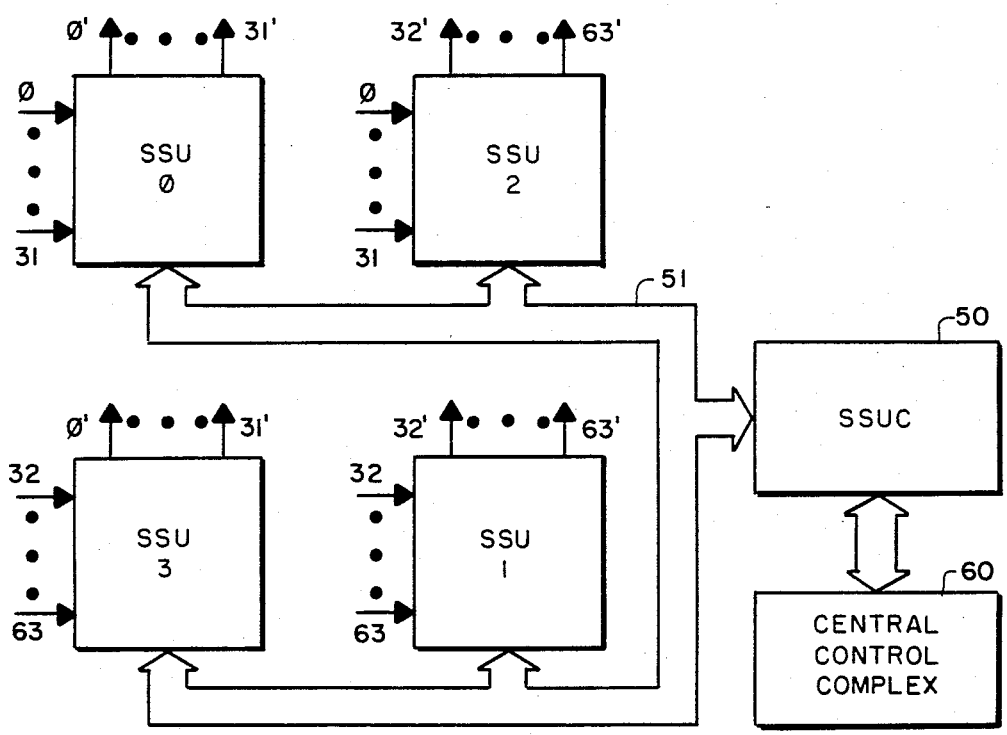
FIG. 2 is a block diagram representing the 64×64 space stage configuration of the present invention.

Turning now to FIG. 2, a representation of the 64×64 space stage 30 of FIG. 1 is illustrated. The space stage is comprised of four identical space stage units (SSU) 0, 1, 2, and 3. Each space stage unit is a 32×32 matrix having 32 inputs (0 to 31 for SSU 0, and SSU 2 and 32 to 63 for SSU 1 and SSU 3) and 32 outputs (0' to 31' for SSU 0 and SSU 3, and 32' to 63' for SSU 1 and SSU 2). Connecting paths between the inputs and outputs of each SSU are controlled by a central control complex 60 through a space stage unit controller (SSUC) 50. The SSUC interfaces the central control complex to each SSU and controls and directs the data between the SSUs and the central control complex. The SSUC communicates with each SSU module via a bus 51 which includes address, data and control lines.

Figure 3:
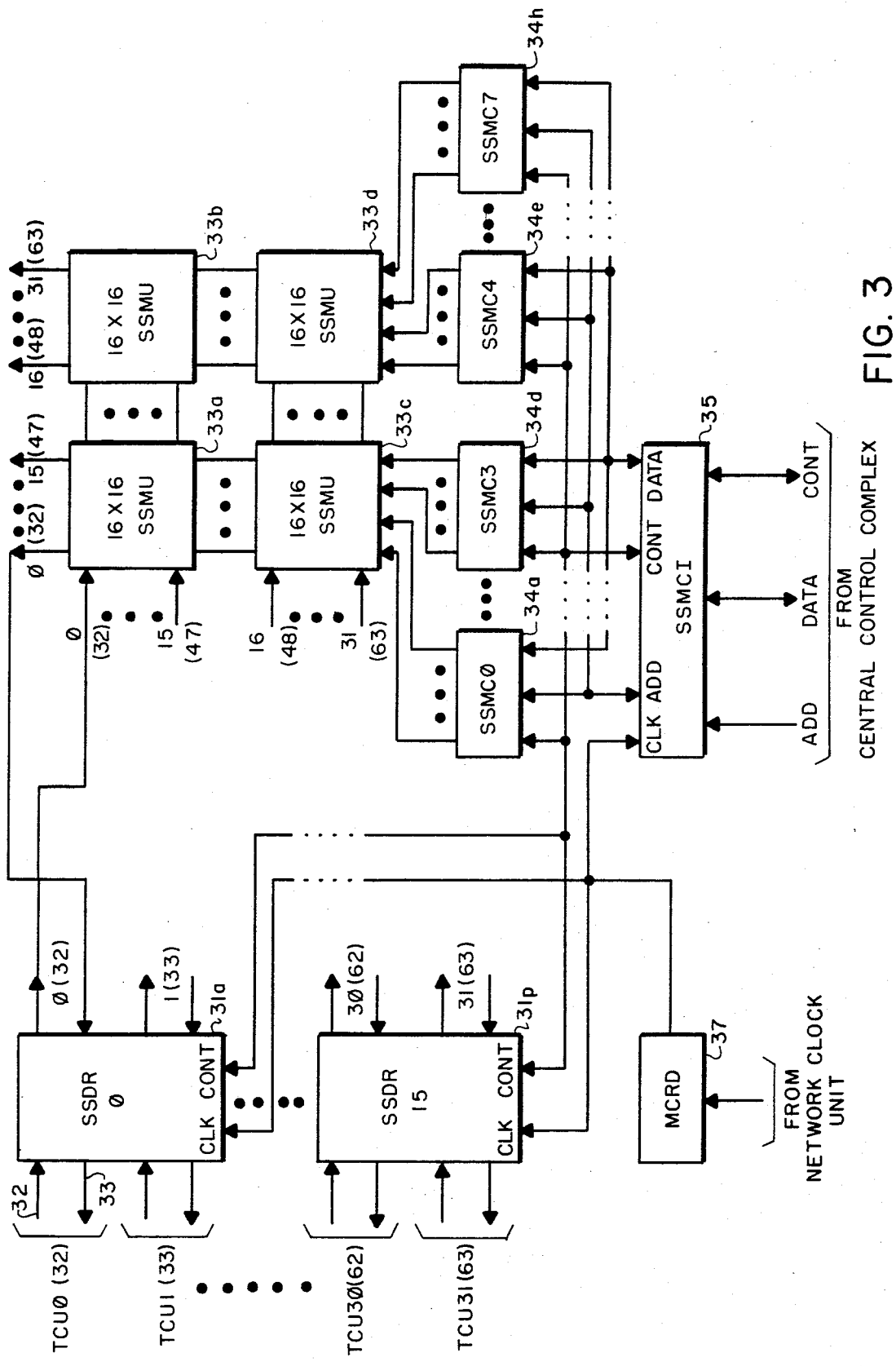
FIG. 3 is a schematic diagram of a space stage unit configured to interconnect one to thirty-two originating time stages and terminating time stages.

Turning now to FIG. 3, a schematic diagram representing a SSU of the present invention is illustrated. It should be noted, that the SSU represented in FIG. 3 is identical for each SSU, i.e. SSU 0, SSU 3, etc., shown in FIG. 2.

PCM samples from the TCUs of the T-S-T network enter and exit the SSU through a space stage driver/receiver (SSDR) interface 31a–31p. It should be noted twelve bits are required to represent the PCM sample, seven bits representing the amplitude of the voice signal, one bit represents the sign of the voice signal, three bits of supervisory signals and one parity bit. Therefore, each input to the SSU from a TCU and each output to a TCU from the SSU is twelve bits wide. Each SSDR includes drivers and receivers as well as buffers for temporarily storing PCM samples before they are sent out to the space stage matrix units (SSMU). Each SSDR 31a–31p can interface the OTS and TTS of two TCUs to the SSU. For example, input 32 of SSDR 31a would be connected to the OTS of TCU 0 for SSU 0 and SSU 2 and to the OTS of TCU 32 for SSU 3 and SSU 1. Output 33 of SSDR 31a would be connected to the TTS of TCU 0 or 32.

The space stage matrix provides a time shared switching path between the OTS and TTS of an individual TCU or between the OTS and TTS of different TCUs. The space stage matrix is comprised of four identical 16×16 space stage matrix units (SSMU) 33a–33d. Each SSMU is constructed from a plurality of 16:1 multiplexers. The multiplexers are combined into a 16×16 SSMU which is 12-bits wide. Control signals supplied to each multiplexer selects and enables the appropriate multiplexers for switching through the space stage matrix. The control signals are applied to each SSMU via a space stage memory control (SSMC). Each space stage memory control 34a–34h consists of four control memories (CM), (not shown) and their associated buffers. Each CM corresponds to a particular TCU TTS. Each CM selects, through control data written within the CM, which one of the sixteen input samples will be output. Address, data and control information are read into each SSMC via a space stage memory control interface (SSMCI). The SSMCI 35 can control eight SSMCs thereby interfacing each SSU to SSUC 50 and central control complex 60 of FIG. 2.

Finally, a timing generator or master clock receiver/distributor (MCRD) 37 is included which provides all the necessary timing signals for the operation of the SSU. The MCRD terminates a master clock signal from a network clock unit (NCU) and distributes a timing reference to the SSDRs, the SSMCs and the SSMCI.

With renewed reference to FIG. 3, a description of the operation of a SSU will be explained. PCM samples from the OTS are written into a buffer within the appropriate SSDR, addressed and strobed with timing signals transmitted from the sending TCU with the PCM samples. For example, in FIG. 3 the sample is transmitted from the TCU 0 on input 32 into a buffer within SSDR 31a. The written sample is latched out to the space stage matrix one time slot after the sample was written into the SSDR. This time slot is referred to as n+1. In time slot n, before time slot n+1, a path through the SSM is selected by reading the control memory within the appropriate SSMC. At the beginning of time slot n+1 the data written in the CM enables the appropriate multiplexers within the SSMU used to output the PCM sample. The PCM sample available at the SSDR buffer at the beginning of time slot n+1 is allowed to ripple through the addressed multiplexers and latched into the selected SSDR for transmission to a TCU near the end of the time slot. For example, the data written into the control memory associated with the TTS of TCU 0 of SSMC 34a, sets up a path through the space stage matrix from the 0 input to the 0 output of SSMU 33a. The PCM sample is latched into the appropriate buffer within SSDR 31a and sent to the TTS of TCU 0. In this manner each SSU is selectively able to provide switching paths between the thirty-two originating time stages and terminating time stages of thirty-two TCUs.

Figure 4:
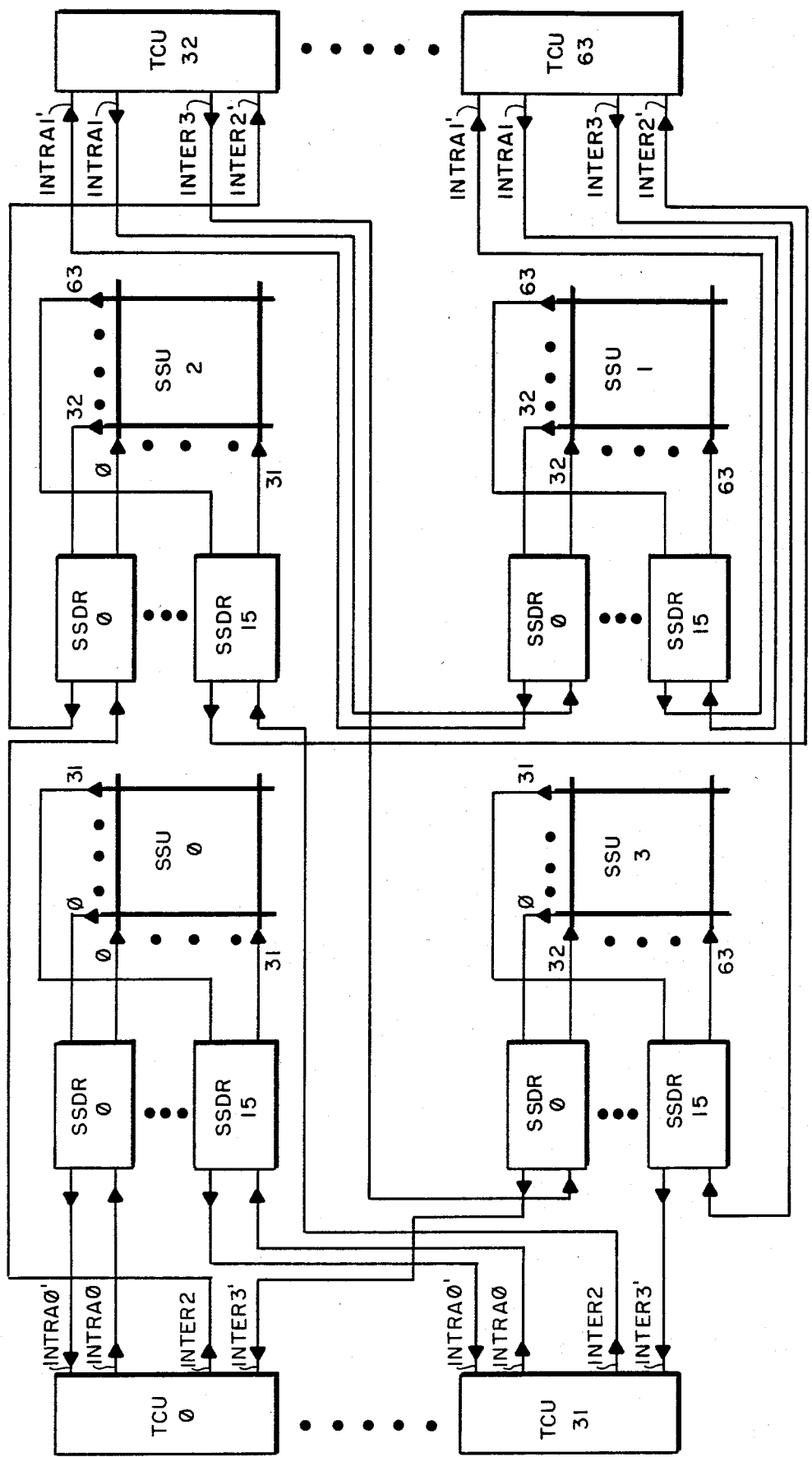
FIG. 4 is a diagram representing the interconnection of sixty-four time and control units (TCU) to the space stage of the present invention.

Turning now to FIG. 4, the complete arrangement for a 64×64 space stage for a T-S-T network is illustrated. As can be seen the arrangement is comprised of a space stage which includes four SSUs; SSUs 0, 1, 2, and 3. Each SSU shown in FIG. 4, includes the requisite SSDR interfaces.

The four SSU modules are interconnected providing time shared switching paths to sixty-four TCUs. The sixty-four TCUs are divided into a first time group, including TCUs 0 through 31 and a second time group, including TCUs 32 through 63. Each SSU is additionally categorized as either an intra-group, (SSU 0 and SSU 1) or an inter-group (SSU 2 and SSU 3). The intra-group SSU 0 interconnects the OTS and TTS of TCUs 0 through 31. Likewise, intra-group SSU 1 interconnects the OTS and TTS of TCUs 32 through 63. Time shared switching paths between the first time group of TCUs (0–31) and the second time group of TCUs (32–63) is accomplished with the inter-group SSUs; SSU 2 and SSU 3. SSU 2 connects the OTSs of TCUs 0 through 31 to the TTSs of TCUs 32 through 63 and SSU 3 connects the OTSs of TCUs 32 through 63 to the TTSs of TCUs 0 through 31.

For example, to establish a communications path from the OTS of TCU 0 to the TTS of TCU 31, TCU 0 is connected to SSU 0 through sending line INTRA 0, SSDR 0, input line 0 of SSU 0, through the SSM to output line 31, SSDR 15 and finally to TCU 31 via receiving line INTRA 0. A return path interconnection can be effected between the OTS of TCU 31 and the TTS of TCU 0 via TCU 31s sending line INTRA 0, SSDR 15, input line 31 through the SSM to output line 0, SSDR 0 and to TCU 0 via receiving line INTRA 0'. Switching paths between the first time group TCUs can be established in any combination through SSU 0 in the same manner described above.

Likewise, the second time group of TCUs (32–63) can be interconnected via sending/receiving lines INTRA 1, INTRA 1' respectively and the input/output lines of SSU 1.

To effect a switching path from the OTS of TCU 0 to the TTS of TCU 63 a connection is made via sending line INTER 2 of TCU 0, SSDR 0 of SSU 2, to input line 0 of SSU 2, through the SSM to output line 63, SSDR 15, and receiving line INTER 2' to TCU 63. The return connection to TCU 0 is effected through SSU 3 via the sending line INTER 3 of TCU 63 through SSU 3 to receiving line INTER 3' of TCU 0.

As can be readily seen in FIG. 4, SSU 2 is arranged to connect the OTSs of TCUs 0 through 31 to the TTSs of TCUs 32 through 63. Conversely, SSU 3 connects the OTSs of TCUs 32 through 63 to the TTSs of TCUs 0 through 31. Thereby, effectively interconnecting all sixty-four TCUs in the T-S-T network through the space stage.

It can be well appreciated by those skilled in the art that even though a single rail arrangement has been illustrated, a second duplicate copy of the space stage can be used in those T-S-T networks employing A and B rails. For example, a fully independently operating space stage would handle all time shared switching paths between TCUs on the A rail and similarly a second space stage would handle all switching between TCUs on the B rail. Both space stages would be identical to the other working independently handling switching between the TCUs connected to their respective rails. Thereby, the space stage described in this embodiment may be copied identically for each rail and is not limited thereto.

It can be appreciated that each one of the functional modules of FIG. 3 can be configured into circuit cards. The circuit cards in turn can be plugged into unit frames forming the SSUs. The circuit cards within the unit frames may be interconnected by a backplane arrangement. The SSDRs of each SSU in turn can be connected to the TCUs via the applicable bidirectional or unidirectional cables thereby, simplifying backplane wiring and the interconnections between the time stage and the space stage of the T-S-T network.

The present invention has been described to the reference of a specific embodiment thereof, for the purpose of illustrating the manner in which the invention may be used to advantage. It will be appreciated by those skilled in the art that the invention is not limited thereto. Accordingly, any and all modifications, variations or equivalent arrangements which may occur to those skilled in the art should be considered to be within the scope of the invention.

What is claimed is:

1. In a time-space-time network including a first time group having a plurality of originating time stages and a plurality of terminating time stages and a second time group having a plurality of originating time stages and a plurality of terminating time stages, a space stage comprising:

first switching matrix means including a plurality of inputs and a plurality of outputs, each of said first switching matrix means inputs connected to a respective one of said first time group originating time stages and each of said plurality of first switching matrix means outputs connected to a respective one of said first time group terminating time stages, said first switching matrix means arranged to provide selectable interconnections between said originating time stages and said terminating time stages of said first group;

second switching matrix means including a plurality of inputs and a plurality of outputs, each of said second switching matrix means inputs connected to a respective one of said second time group originating time stages and each of said second switching matrix means outputs connected to a respective one of said second time group terminating time stages, said second switching matrix means arranged to provide selectable interconnections between said originating time stages and said terminating time stages of said second group;

third switching matrix means including a plurality of inputs and a plurality of outputs, each of said third switching matrix means inputs connected to a respective one of said first time group originating time stages and each of said third switching matrix means outputs connected to a respective one of said second group terminating time stages, said third switching matrix means arranged to provide selectable interconnections between said originating time stages of said first time group and said terminating time stages of said second time group; and fourth switching matrix means including a plurality of inputs and a plurality of outputs, each of said fourth switching matrix means inputs connected to a respective one of said second time group originating time stages and each of said fourth switching matrix means outputs connected to a respective one of said first time group terminating time stages, said fourth switching matrix means arranged to provide selectable interconnections between said originating time stages of said second time group and said terminating time stages of said first time group.

2. The space stage as claimed in claim 1, wherein said space stage further includes a space stage controller connected to each of said first, second, third and fourth switching matrix means and a central control complex and a source of control information, said space stage controller is arranged to provide said control information to each of said first, second, third and fourth switching matrix means from said central control complex 3. The space stage as claimed in claim 2, wherein said first switching matrix means includes:

a plurality of multiplexer units connected together forming a space stage matrix unit having a plurality of inputs and a plurality of outputs, each of said plurality of multiplexer units including control inputs;

a plurality of space stage driver/receiver interfaces each including inputs and outputs, each space stage driver/receiver interface input connected to a respective one of said first time group originating time stages and each space stage driver/receiver interface output connected to a respective one of said first time group terminating time stages, said space stage driver/receiver further connecting each of said first time group originating time stages and terminating time stages to an input and output respectively of said space stage matrix unit;

a plurality of space stage memory control units, each connected to respective multiplexer unit control inputs, each space stage memory control unit arranged to receive and store control information enabling respective multiplexers, providing a switched path between said originating time stages and said terminating time stages of said first group; and a space stage memory control interface connecting each of said space stage memory control units to said space stage controller, said space stage memory control interface arranged to distribute said control information to said space stage memory control units.

4. The space stage as claimed in claim 2, wherein said second switching matrix means includes:
a plurality of multiplexer units connected together forming a space stage matrix unit having a plurality of inputs and a plurality of outputs, each of said plurality of multiplexer units including control inputs;
a plurality of space stage driver/receiver interfaces each including inputs and outputs, each space stage driver/receiver interface input line connected to a respective one of said second time group originating time stages and each space stage driver/receiver interface output connected to a respective one of said second time group terminating time stages, said space stage driver/receiver further connecting each of said second time group originating time stages and terminating time stages to an input and output respectively of said space stage matrix unit;
a plurality of space stage memory control units each connected to respective multiplexer unit control inputs, each space stage memory control unit arranged to receive and store control information enabling respective multiplexers, providing a switched path between said originating time stages and said terminating time stages of said second group; and
a space stage memory control interface connecting each of said space stage memory control units to said space stage controller, said space memory control interface arranged to distribute said control information to said space stage memory control units.

5. The space stage as claimed in claim 2, wherein said third switching matrix means includes:
a plurality of multiplexer units connected together forming a space stage matrix unit having a plurality of inputs and a plurality of outputs, each of said plurality of multiplexer units including control inputs;
a plurality of space stage driver/receiver interfaces each including inputs and outputs, each space stage driver/receiver interface input connected to a respective one of said first time group originating time stages and each space stage driver/receiver interface output connected to a respective one of said second time group terminating time stages, said space stage driver/receiver further connecting each of said first time group originating time stages and said second time group terminating time stages to an input and output respectively of said space stage matrix unit;
a plurality of space stage memory control units each connected to respective multiplexer unit control inputs, each space stage memory control unit arranged to receive and store control information enabling respective multiplexers, providing a switched path between said first time group originating time stages and said second time group terminating time stages; and
a space stage memory control interface connecting each of said space stage memory control units to said space stage controller, said space stage memory control interface arranged to distribute said control information to said space stage memory control units.

6. The space stage as claimed in claim 2, wherein said fourth switching matrix means includes:
a plurality of multiplexer units connected together forming a space stage matrix unit having a plurality of inputs and a plurality of outputs, each of said plurality of multiplexer units including control inputs;
a plurality of space stage driver/receiver interfaces each including inputs and outputs, each space stage driver/receiver interface input connected to a respective one of said second time group originating time stages and each space stage driver/receiver interface output connected to a respective one of said first time group terminating time stages said space stage driver/receiver further connecting each of said second time group originating time stages and first time group terminating time stages to an input and output respectively of said space stage matrix unit;
a plurality of space stage memory control units each connected to respective multiplexer unit control inputs, each space stage memory control unit arranged to receive and store control information enabling respective multiplexers, providing a switched path between said second time group originating time stages and said first time group terminating time stages; and
a space stage memory control interface connecting each of said space stage memory control units to said space stage controller, said space stage memory control interface arranged to distribute said control information to said space stage memory control units.

* * * * *